(No Model.)

B. ATKINSON.
SAFETY GATE FOR RAILROAD CROSSINGS.

No. 295,324. Patented Mar. 18, 1884.

Witnesses:
Gustave Bohn
Aurelius J. Joyce

Inventor.
Benjamin Atkinson
by John L. Griffiths &
Alfred H. Potts
his attys.

UNITED STATES PATENT OFFICE.

BENJAMIN ATKINSON, OF INDIANAPOLIS, INDIANA.

SAFETY-GATE FOR RAILROAD-CROSSINGS.

SPECIFICATION forming part of Letters Patent No. 295,324, dated March 18, 1884.

Application filed March 9, 1883. (No model.)

*To all whom it may concern:*

Be it known that I, BENJAMIN ATKINSON, a citizen of the United States, and a resident of Indianapolis, county of Marion, and State of Indiana, have invented certain new and useful Improvements in Railroad and other Safety Gates; and I do hereby declare that the following is a full, clear, and exact description of the invention, which will enable others skilled in the art to which it belongs to make and use the same.

My invention is a gate to be erected at railway-crossings, at toll-stations, at the entrance to draw-bridges, and other places requiring such structures. It is constructed as fully described hereinafter.

Figure 1:
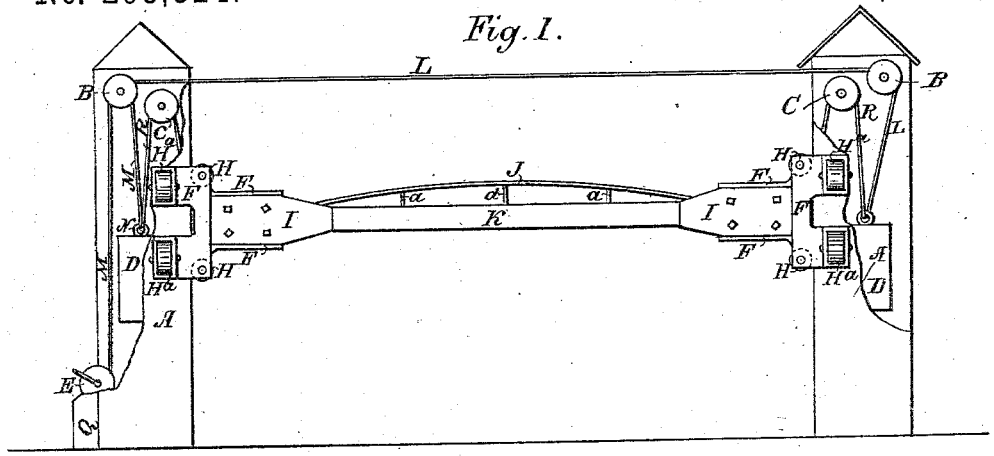
Figure 2:
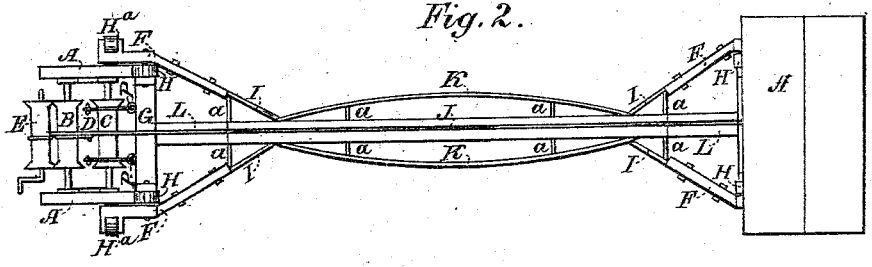
Figure 3:
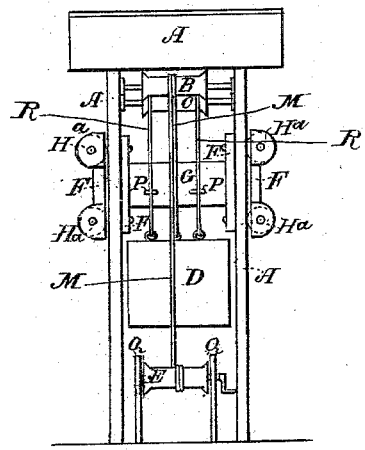

In the drawings, Figure 1 is a side view of my invention, showing the gate supported between its two towers or abutments, and the cable and other devices by which it is operated from one side. Fig. 2 is a top view of Fig. 1, showing details not exposed in Fig. 1. Fig. 3 is an end view displaying in detail the operating devices of one tower, the said devices being the same in both towers.

In Fig. 1, A A represent the towers or abutments supporting the cross-beam or gate, and containing the operating devices by which the gate is raised or lowered at will. It will be noticed that this gate has advantages over others used for such purposes in this, that the mechanism used is entirely above ground, is all thoroughly protected from the weather, and can never be affected by the heat or cold, nor subject to frost or freezing, as is common to those structures having their operating devices under ground. The towers will be constructed of sufficient height to allow the gate to rise to such a point as will admit of the passage under it of any vehicle or engine. The gate reaches from one abutment to the other, having at each extremity arms F F, extending over to embrace the sides of the towers, thus giving strength and solidity to the structure and reducing the strain upon the gate.

In Fig. 1 J and in Fig. 2 K K are trusses extending across the center of the gate to secure the same object.

In Fig. 1, at the extremities of the gate, are observed casters H H in dotted lines, said casters working on the side surface of said towers. H² H² are casters pivoted upon the embracing-arms F F of the gate, which work upon the end surfaces of the tower. It is obvious that the use of these casters at the extremities of the gate working upon the smooth surface of the towers, by which said gate is supported, reduces the friction and relieves the strain upon the operating devices used to raise and lower the gate.

A side view of the operating devices is shown in Fig. 1, through the broken walls of the towers. R are cables passing over pulleys C, one end of each of which is attached to the gate and the other is fastened to the weight D by rings N. The cable M passes over pulley B, one end being also attached to the weight D and the other being wound upon the drum of the windlass E. The operating devices at the right-hand tower are similar to those above mentioned—that is to say, the cables R pass over pulley C, their ends being attached, respectively, to the gate and to the weight D, the weight being raised by the cable L, which extends from one tower to the other, and passes over pulley B. This cable L is fastened to the cable M at the left, so that when the crank of the windlass E is turned and the cable M is coiled upon the drum the cable L is drawn downward toward the drum. Winding the cable M upon the drum raises the weight D and allows the gate to move downward by the slacking of the cable R passing over pulley C. This coiling of the cable M upon the drum E also draws the cable L, and thus simultaneously sets in motion the similar operating devices in the right-hand tower, lowering both ends of the gate at once. The raising of the gate is accomplished by the reversal of the crank-movement uncoiling the cable M from the drum E. The slack upon the cable L thus obtained is imparted to the cables in the right-hand tower, permitting the balance-weights in both towers to fall, and in so doing to raise the gate. By this means the raising of the gate becomes an automatic movement.

P P are staples in the end beam, G, of the gate, connecting the two embracing-arms F F, to which are attached the cables R, by which the gate is raised or lowered.

It will be seen from Figs. 1 and 2 that the windlass E is placed outside the tower, the cable on the outside passing down through a shield, Q. (Seen in Fig. 1.)

It is often desirable to place two or more gates at railway-crossings, and to adjust the mechanism so that one man can operate all the gates while standing at one point. This can be accomplished with my invention, it being only necessary to arrange a pulley so that a cable may pass to the opposite gate, by which its operating devices shall be set in motion simultaneously with those at which the operator stands.

I claim—

1. The combination, with the towers, of a gate, preponderating counterbalance-weights connected to each end of the gate, a windlass, and connections from the windlass to each weight, whereby upon operating the windlass both weights may be raised and the gate allowed to fall, substantially as described.

2. The combination of the towers A A, a vertically-moving gate, the cables R, attached to said gate, the cable M, attached to the weight and windlass, with suitable pulleys for such cables, and the cable L, connecting the operating mechanism in said towers, whereby both ends of the gate may be raised or lowered simultaneously, as set forth.

3. The combination, with the towers, of a gate provided with the end beams, G G, and having the braces J K, of the arms F, extending between said braces and the end beams, and the friction-rollers H and H, as set forth.

BENJAMIN ATKINSON.

Witnesses:
LOUIS A. BUDENZ,
CHARLES A. MARTINDALE.